United States Patent
Ebiko

(10) Patent No.: US 8,881,779 B2
(45) Date of Patent: Nov. 11, 2014

(54) PNEUMATIC TIRE WITH TREAD HAVING DENT PARTS AND SIPES

(75) Inventor: Masahiro Ebiko, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1142 days.

(21) Appl. No.: 12/537,629

(22) Filed: Aug. 7, 2009

(65) Prior Publication Data

US 2010/0051154 A1 Mar. 4, 2010

(30) Foreign Application Priority Data

Sep. 1, 2008 (JP) .................................. 2008-223486

(51) Int. Cl.
*B60C 11/12* (2006.01)
*B60C 11/03* (2006.01)

(52) U.S. Cl.
CPC ......... *B60C 11/0309* (2013.01); *B60C 11/0306* (2013.01); *B60C 11/1263* (2013.01); *B60C 2011/1209* (2013.01); *B60C 2011/1213* (2013.01); *B60C 2011/0388* (2013.01); *B60C 2011/0383* (2013.01); *B60C 2011/0381* (2013.01); *Y10S 152/03* (2013.01)
USPC ............. 152/209.18; 152/209.21; 152/DIG. 3

(58) Field of Classification Search
USPC ............................ 152/209.18, 209.21, DIG. 3
See application file for complete search history.

(56) References Cited

U.S. PATENT DOCUMENTS

| | | | | |
|---|---|---|---|---|
| 5,031,680 A | * | 7/1991 | Kajikawa et al. | 152/209.18 |
| 6,123,130 A | * | 9/2000 | Himuro et al. | 152/DIG. 3 |
| 6,561,242 B2 | | 5/2003 | Chaen et al. | |
| 6,923,232 B1 | * | 8/2005 | Welbes et al. | 152/209.18 |
| 6,986,372 B2 | * | 1/2006 | Below | 152/209.21 |
| 8,714,218 B2 | * | 5/2014 | Ebiko | 152/209.18 |
| 2008/0271826 A1 | * | 11/2008 | Maxwell et al. | 152/209.18 |

FOREIGN PATENT DOCUMENTS

| | | | |
|---|---|---|---|
| JP | 2980970 B2 | * | 11/1999 |
| JP | 2001-233021 A | | 8/2001 |
| JP | 2006-056459 A | * | 3/2006 |
| JP | 2007-153275 A | | 6/2007 |
| WO | WO-2009/130936 A1 | * | 10/2009 |

OTHER PUBLICATIONS

Machine translation for Japan 2006-056459 (no date).*
Machine translation for Japan 2980970 (no date).*

* cited by examiner

*Primary Examiner* — Steven D Maki
(74) *Attorney, Agent, or Firm* — Global IP Counselors, LLP

(57) ABSTRACT

Provided is a pneumatic tire which achieves both of excellent wet traction and wear resistance from an early stage to an advanced stage of wear. Multiple dent parts are formed, at certain intervals in a tire circumferential direction, in both side walls of each of at least two land portions of multiple land portions being formed in a tread surface and extending in the tire circumferential direction. Each of the dent parts has a smaller depth than main grooves that define the land portion where this dent part is formed. Multiple sipes are formed to traverse the land portion in a tire width direction between the right and left dent parts opposed to each other. Each of the sipes has a greater depth in both end regions opening to the dent parts than in a center region thereof.

11 Claims, 3 Drawing Sheets

PNEUMATIC TIRE WITH TREAD HAVING DENT PARTS AND SIPES

BACKGROUND OF THE INVENTION

1. Field of the Invention

The present invention relates to a pneumatic tire, and more specifically a pneumatic tire that is excellent in both wet traction and wear resistance.

2. Description of the Related Art

In order to improve tires in terms of a driving stability on wet roads and a braking ability on snowy and icy roads (hereinafter, these abilities are collectively referred to as "wet traction"), there has been heretofore a widely used practice in which sipes extending in a tire width direction are formed in tread land portions to produce an edge effect of improving drainage and snow clearing of the tires. In this regard, if an increased number of sipes or deeper sipes are formed in tread land portions, the tires have a problem of decrease in the stiffness of the land portions, and accordingly decrease in the wear resistance on dry roads. On the other hand, if the depth of sipes formed in the tread land portions is decreased, the tires are advantageous from the viewpoint of the wear resistance, but have another problem that, when the wear of the tires reaches an advanced stage, the wet traction is sharply decreased due to disappearance of the sipes.

Thus, the wet traction and the wear resistance are in a trade-off relationship as described above, and various proposals have been heretofore made to overcome the trade-off problem. One of the approaches to this issue is disclosed in a proposal to arrange block rows in a tread portion and to form a sipe in the surface of each of blocks included in each block row so that the sipe can traverse the block and open to main grooves. In this proposal, specifically, the sipe is formed to be shallow at its end parts on the opening sides and to be deep at its center part for the purpose of ensuring the stiffness of the block, and is also formed to be wide at the end parts on the opening sides for the purpose of ensuring the drainage (for example, Japanese patent application Kokai publication No. 2001-233021). Another proposal in this approach is that a block is formed to be narrow at its front and rear parts in a tire circumferential direction in a planar shape and to have a recessed portion in its center position in the tire circumferential direction (for example, Japanese patent application Kokai publication No. 2007-153275).

In these proposals, however, a sipe is formed to have shallow end parts on the opening sides. For this reason, when the wear reaches an advanced stage, the sipe on the opening sides disappears and thereby rain water or the like trapped in a center part of the sipe has nowhere to escape. As a result, these proposals have a problem of sharp decrease of the wet traction, and, in fact, do not provide sufficiently effective measures for achieving excellent wet traction and wear resistance together.

SUMMARY OF THE INVENTION

It is an object of the present invention to solve the aforementioned conventional problems, and to provide a pneumatic tire that achieves excellent wet traction and wear resistance together in a long period from an early stage to an advanced stage of wear.

To achieve the foregoing object, the present invention provides a pneumatic tire in which: multiple land portions defined by main grooves extending in a tire circumferential direction are formed in a tread surface; and multiple dent parts are formed, at certain intervals in the tire circumferential direction, in both side walls of each of at least two land portions of the multiple land portions. The pneumatic tire according to the present invention is characterized in that: each of the dent parts has a smaller depth than the main grooves defining the land portion where this dent part is formed; multiple sipes are each formed to traverse in the tire width direction between the dent parts formed in both the side walls of the land portion; and each of the sipes has a greater depth in both end regions opening to the dent parts than in a center region between both the end regions.

In addition, it is preferable that the pneumatic tire with the aforementioned structure be configured as described in the following features (1) to (5).

(1) The dent parts formed in both the side walls of the land portion are arranged to be offset from each other in the tire circumferential direction.

(2) A width W1 of a main part of the land portion where the dent parts are formed in both the side walls is 10 mm to 50 mm. In this case, a width W2 of each of the dent parts in the tire width direction is 5% to 20% of the width W1 of the main part of the land portion.

(3) The sipes are each formed to have multiple bending parts, and to be inclined in the center region with respect to the tire width direction. In this case, a degree of 70° to 150° is set for an intersecting angle between a center part of each of the sipes in the center region inclined with respect to the tire width direction, and a side part of the sipe extending from the bending part at either end of the center part of the sipe toward a corresponding one of the end regions.

(4) Each of the dent parts in a plan view is in a trapezoidal shape having, as a lower base, an edge line between two intersections of the dent part and the main groove that defines the land portion where the dent part is formed, and extending to an inner side of the land portion, the trapezoidal shape being set to have the lower base $L_1$ within a range of 10 mm≤$L_1$≤20 mm in length, and an upper base $L_2$ within a range of 3 mm≤$L_2$≤15 mm in length, where $L_2$<$L_1$. In this case, two or more land portions where the dent parts are formed are arranged side by side with a single main groove in between. Moreover, the dent parts in side walls, facing each other across the main groove, of the adjacent land portions are arranged in a way that the upper bases of the dent parts overlap each other along the tire circumferential direction and that a length $L_3$ of the overlapping part of the upper bases is 3 mm to 30 mm.

(5) The land portion where the dent parts are formed in both the side walls has a lug groove formed between each two of the dent parts adjacent in the tire circumferential direction, and thereby is formed as a block row.

According to the present invention, the multiple dent parts are formed, at the certain intervals, in both the side ends of each of the at least two land portions of the multiple land portions being formed in the tread surface and extending in the tire circumferential direction, and each of the dent parts has a smaller depth than the main grooves that define the land portion where this dent part is formed. With this configuration, the wet traction is improved by an edge effect produced by the dent parts thus formed, and the wear resistance is improved by ensuring the stiffness of the land portion around the dent part because the land portion at the dent part is formed to have a two-stepped cross sectional shape.

Furthermore, the multiple sipes traversing in the tire width direction are formed between the dent parts formed on a tread surface side (an upper step side) of the land portion formed in the two-stepped shape. Since each of the sipes has a greater depth in both end regions opening to the dent parts than in a center region between both the end regions, excellent wet traction can be maintained from an early stage to an advanced stage of wear by ensuring both of the stiffness of the land portion around the dent parts and the edge effect on the opening side of the sipes.

DESCRIPTION OF THE PREFERRED EMBODIMENTS

Figure 1:
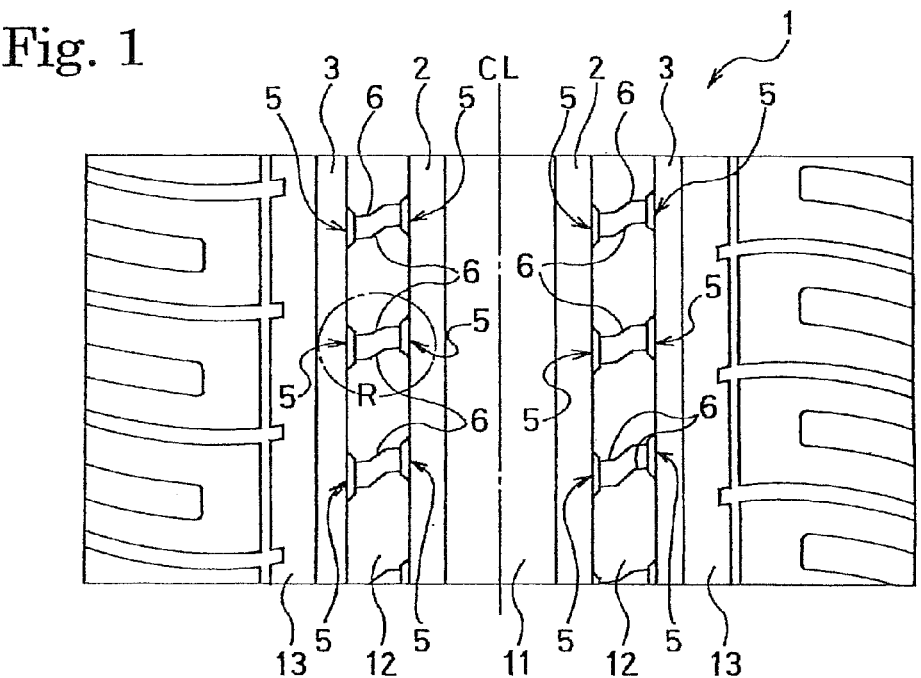
FIG. 1 is a plan development view of a main part of a tread surface in an embodiment of a pneumatic tire of the present invention.

Hereinafter, a pneumatic tire according to the present invention will be described in detail based on embodiments illustrated in the drawings.

As illustrated in FIG. 1, multiple (five in FIG. 1) land portions 11, 12, 12, 13, 13 are formed in a tread surface 1 of a pneumatic tire according to the present invention. The land portions 11, 12, 12, 13, 13 are defined by main grooves 2, 2, 3, 3 extending in a tire circumferential direction with a tire center line CL in between. In both side walls of each of at least two (two in FIG. 1) land portions 12, 12 of the land portions 11, 12, 12, 13, 13, multiple dent parts 5 are formed at certain intervals in the tire circumferential direction.

Figure 2:
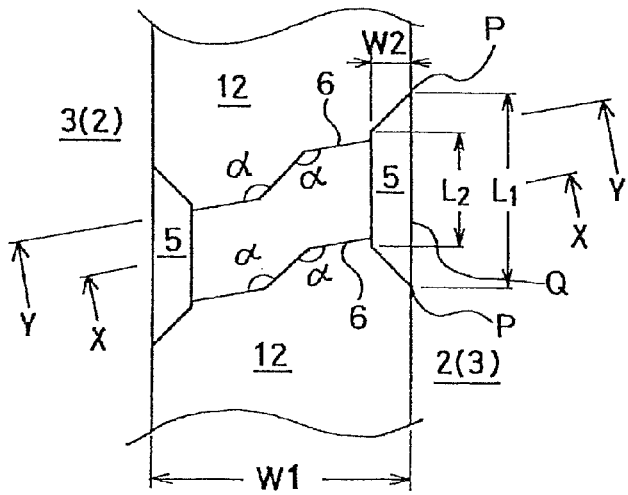
FIG. 2 is an expanded view of a part R in FIG. 1.
Figure 3:
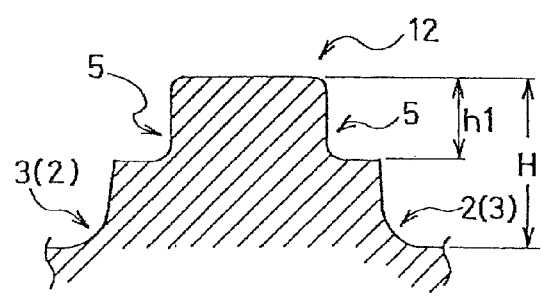
FIG. 3 is a cross sectional view taken along the line X-X in FIG. 2.
Figure 4:
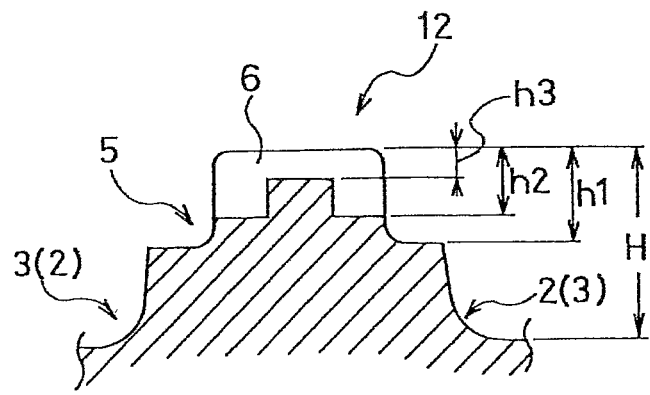
FIG. 4 is a cross sectional view taken along a sipe in FIG. 2 and viewed in a Y-Y arrow direction.

Moreover, in the pneumatic tire according to the present invention, a depth h1 of the dent part 5 is smaller than a depth H of the main grooves 2, 3 defining the land portion 12 where the dent part 5 is formed, as shown in FIG. 3. In addition, multiple (two in FIG. 2) sipes 6 are formed so as to extend in the tire width direction between the right and left dent parts 5, 5 that are opposed to each other. In each of the sipes 6, a depth in both end regions opening to the dent parts 5 is different from a depth in a center region connecting both the end regions, as shown in FIG. 4. More specifically, a depth h2 of the sipe 6 in both the end regions is greater than a depth h3 of the sipe 6 in the center region (h2>h3).

The pneumatic tire thus configured according to the present invention has the wet traction improved by the edge effect produced by the dent parts 5 thus formed. In addition, the land portion 12 is formed to have a two-stepped cross sectional shape at a part of each of the dent parts 5 as shown in FIG. 3, and thus the stiffness of the land portion 12 around the dent parts 5 is ensured, which in turn improves the wear resistance of the pneumatic tire of the present invention.

Moreover, the multiple sipes 6 are each formed to traverse in the tire width direction between the dent parts 5 formed on the tread surface sides of the land portion 12, which is formed in the two-stepped shape. Each of the sipes 6 is formed to have a greater depth in both the end regions opening to the dent parts 5 than that of the center region, in other words, is formed to be deeper in both the end regions and to be shallower in the center region. The pneumatic tire thus configured is capable of maintaining excellent wet traction from an early stage to an advanced stage of wear by ensuring the stiffness of the land portion 12 around the dent parts 5 while surely producing the edge effect of the sipes 6 on the opening sides.

In general, according to a tread pattern structure and the size of a tire, the pneumatic tire of the present invention is set to have dimensions within the following ranges: the depth H of the main grooves 2, 3 is 8 mm to 15 mm; the depth h1 of the dent part 5 is 6 mm to 13 mm; the width of the sipe 6 is 0.4 mm to 1.5 mm; the depth h2 of the sipe 6 in both the end regions is 5 mm to 13 mm; and the depth h3 of the sipe 6 in the center region is 2 mm to 6 mm.

Although the foregoing embodiment shown in FIG. 1 illustrates a case where five ribs extending in the tire circumferential direction are formed in the tread surface 1 as the land portions, the number and shape of the land portions are not limited to this case. In addition, FIG. 1 shows the land portions 11, 13, 13 while omitting various types of grooves formed in the surfaces of the land portions 11, 13, 13. In fact, however, in the pneumatic tire of the present invention, various types of grooves suitable to achieve performance required for the tire are formed in the surface of the land portions 11, 13, 13.

Furthermore, there is also a case where three or more sipes 6 are formed to traverse in the tire width direction between each pair of the right and left dent parts 5, which are opposed to each other, in the land portion 12. Additionally, other than the aforementioned sipes 6 traversing in the tire width direction, an additional sipe (not illustrated) may be provided to the land portion 12 between the dent parts 5 adjacent to each other in the tire circumferential direction. In this case, the number and the depth of such additional sipes are not limited particularly. Moreover, as will be described later, in the case of a tire intended to achieve excellent wet traction especially, the land portion 12, as a whole, may be formed in a block row with lug grooves 4 that are formed between the dent parts 5 adjacent in the tire circumferential direction so as to traverse the land portion 12 in the tire width direction.

In the present invention, the right and left dent parts 5, 5 formed in both the side walls of the land portion 12 so as to be opposed to each other are preferably formed to be offset from each other in the tire circumferential direction as shown in FIG. 1. Such placement of the dent parts 5 improves the drainage and thereby ensures the wet traction at a high level. Here, the offset amount between the right and left opposed dent parts 5, 5 in the tire circumferential direction is set on a case-by-case basis depending on the width of the land portion 12, but is generally set to be on the order of 2 mm to 10 mm.

Moreover, a width W1 of a main part of the land portion 12 (a part excluding the right and left dent parts 5, 5) is set to 10 mm to 50 mm preferably, and is set to 15 mm to 30 mm more preferably. When the width W1 of the main part of the land portion 12 is less than 10 mm, the stiffness of the land portion 12 is so decreased that the wear resistance is difficult to improve. On the other hand, when the width W1 is more than 50 mm, the drainage and the snow clearing are adversely affected, so that the wet traction is difficult to ensure.

In addition, in the pneumatic tire of the present invention, the width W2 of the dent part 5 in the tire width direction is set to 5% to 20% preferably, and 7% to 15% more preferably, of the width W1 of the main part of the land portion 12. This setting ensures the wet traction at a high level while maintaining the excellent wear resistance.

In the present invention, the shape of the sipe 6 traversing in the tire width direction between the right and left dent parts 5, 5 opposed to each other is not particularly limited, but the sipe 6 is preferably formed to have several bending parts, as shown in FIGS. 1 and 2, for the purpose of ensuring the excellent wet traction. More specifically, the sipe 6 is preferably formed so that both the end regions can extend approximately in the tire width direction while the center region can be inclined with respect to the tire width direction.

In the above case, a degree within a range of 70° to 150° preferably, and 90° to 130° more preferably, is set for an intersecting angle α between a center part of the sipe 6 in the center region inclined with respect to the tire width direction and a side part of the sipe 6 extending from the bending part of either side of the center part to the corresponding end region. When the intersecting angle α formed by the sipe 6 bent at the bending part is set to be in the above range, the stiffness of the land portion 12 is ensured, and thereby the wear resistance is effectively prevented from decreasing. In this respect, it is more preferable to form the sipe 6 to have the bending part shallow in depth. Thereby, the stiffness of the land portion 12 can be optimized.

In the present invention, as shown in FIG. 2, the dent part 5 is preferably formed to have a trapezoidal shape in a plan view. More specifically, the trapezoidal shape has, as a lower base, an edge line Q between two intersections P, P, and extends to the inner side of the land portion 12, where the intersections P, P denote intersections between the dent part 5 and the main groove 2 or 3 that defines the land portion 12 where the dent part 5 is formed. The trapezoidal shape is set to have the lower base $L_1$ within a range of $10 \text{ mm} \leq L_1 \leq 20 \text{ mm}$ in length, and an upper base $L_2$ within a range of $3 \text{ mm} \leq L_2 \leq 15$ mm in length, where $L_2 < L_1$. With this configuration, the stiffness of the land portion 12 around the dent part 5 is prevented from decreasing, which, in turn, effectively improves the wet traction while ensuring the wear resistance.

Figure 5:
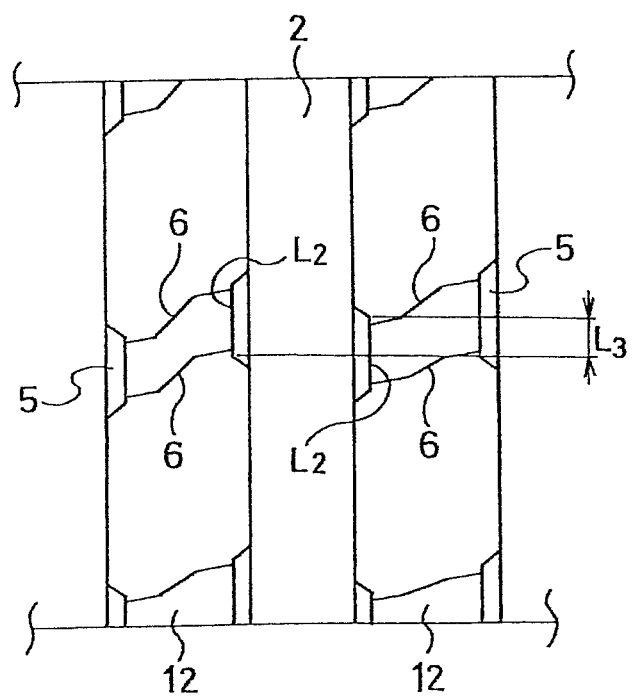
FIG. 5 is a plan view showing a part of a tread surface of another embodiment of the present invention.

In some cases, the pneumatic tire of the present invention is formed to have two or more (two in FIG. 5) land portions 12, where the dent parts 5 are formed, arranged side by side with a single main groove 2 in between as shown in FIG. 5. In this case, the dent parts 5, 5 in the side walls, facing each other across the main groove 2, of the adjacent land portions 12 are arranged so that their upper bases can overlap each other along the tire circumferential direction and that a length $L_3$ of the overlapping part of the upper bases can be 3 mm to 30 mm preferably, and 5 mm to 15 mm more preferably. This arrangement allows both the wear resistance and the wet traction to be improved in good balance.

Figure 6:
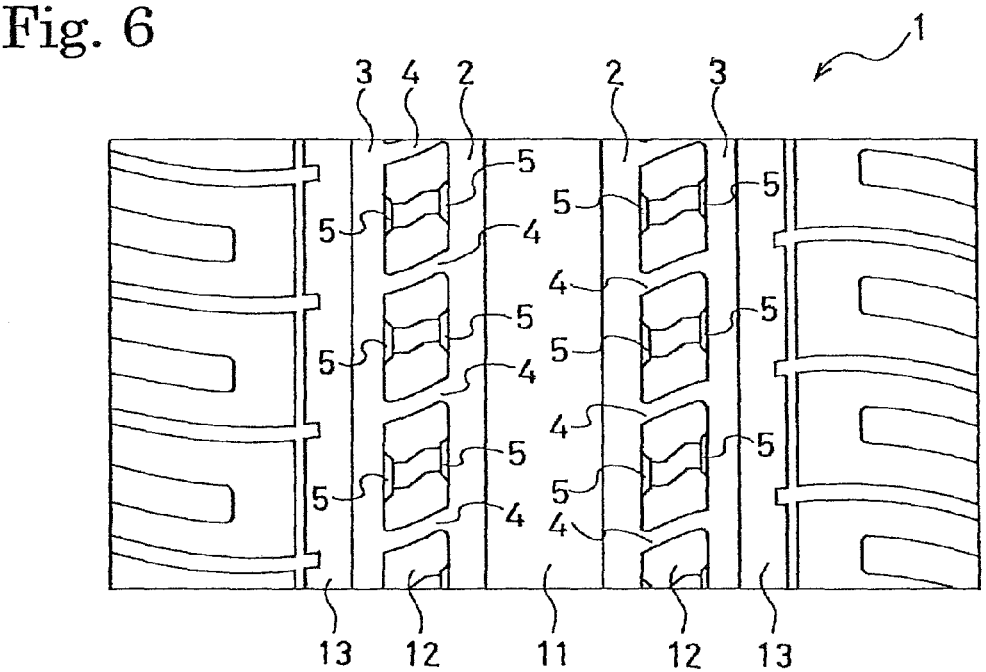
FIG. 6 is a plan development view showing a main part of a tread surface of yet another embodiment of the present invention.

In an embodiment shown in FIG. 6, a lug groove 4 traversing in the tire width direction is formed between each two dent parts 5, 5 in the land portion 12, which are adjacent in the tire circumferential direction. The lug grooves 4 thus formed divide the land portion 12 in the circumferential direction into multiple blocks, whereby the whole of the land portion 12 is formed as a block row. When the whole of the land portion 12 is formed as a block row as described above, the wet traction can be improved even more surely. Also in this case, in addition to the sipe 6, another sipe (not illustrated) traversing the land portion 12 in the tire width direction may be formed in each of the blocks.

Figure 7:
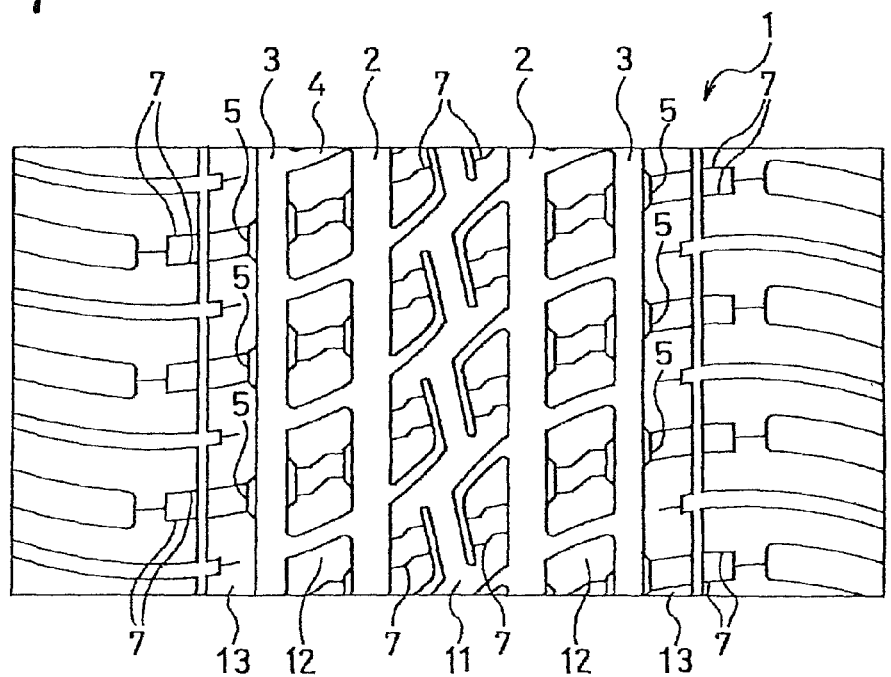
FIG. 7 is a plan development view showing a main part of a tread surface of still another embodiment of the present invention.

In an embodiment shown in FIG. 7, a lug groove 4 is formed between each two dent parts 5, 5 in the land portion 12, which are adjacent in the tire circumferential direction. This lug groove 4 is inclined with respect to the tire width direction and extends to the inside of a land portion 11 next to the land portion 12. Inside the land portion 11, the lug groove 4 has the tip end bent in a dogleg shape. In addition, sipes 7 are formed to traverse a space between the dogleg-shaped tip end of the lug groove 4 and the main groove 2 formed between the land portions 11, 12. Additionally, in this embodiment, dent parts 5 are formed, at certain intervals in the tire circumferential direction, in a side wall, on the main groove 3 side, of each of land portions 13. Moreover, other sipes 7 are formed to extend in the tire width direction from each of the dent parts 5 in the land portion 13 toward a shoulder side of the tire. Employing such groove arrangement improves the wet traction to a large extent.

As has been described above, in the pneumatic tire of the present invention, the dent parts 5 are formed, at the certain intervals in the tire circumferential direction, in both the side walls of each of at least two land portions 12, 12 out of the multiple land portions that are formed in the tread surface 1 to extend in the tire circumferential direction. The depth h1 of each of the dent parts 5 is smaller than the depth H of the main grooves 2, 3 that define the land portion 12 where the dent part 5 is formed. In addition, the multiple sipes 6 traversing in the tire width direction are formed between the dent parts 5, 5 formed in both the side walls of the land portion 12. The depth of each of the sipes 6 is set such that the depth in both the end regions opening to the dent parts 5, 5 is great whereas the depth of the center region is smaller than that of both the end regions. The sipes 6 thus configured allow the wet traction and the wear resistance to be maintained at high levels in good balance from an early stage to an advanced stage of wear. Having a simple structure, the aforementioned configuration is capable of producing such an excellent effect that the configuration is usable, as a pattern structure, for a wide range of tires for all seasons.

EXAMPLE

The tires of the present invention (Examples 1 to 3) and comparative tires (Comparative Examples 1 to 3) were fabricated in size of P265/70R17 113H with a tread pattern of the pattern shown in FIG. 7 so as to entirely have the same specifications in common except for the land portion 12. The tires of Examples 1 to 3 and Comparative Examples 1 to 3 were formed differently from each other in terms of the width W1 of the main part of the land portion 12, the depth h1 of the dent part 5, the depth h2 of the sipe 6 in both the end regions, and the depth h3 of the sipe 6 in the center region, as shown in Table 1. The main grooves 2, 3 in each of the tires were formed with a depth H of 11 mm.

These six types of tires were evaluated in terms of the wet traction and the wear resistance by using the following test method. The results of the evaluations are also shown in Table 1 on an index basis using the result of Comparative Example 1 as the standard with an index of 100. The higher the numerical value, the higher the wet traction and the wear resistance.
[Wet Traction]

Each of tires was mounted on a rim of 17×8.0J, and was inflated until the air pressure reaches 210 kPa. Then, the tires were mounted as front and rear wheels on an SUV with a 6 L displacement engine. The SUV was driven to run on a snowy road, and then the brakes were locked up while the SUV was running at a speed of 40 km/h. At this time, the braking distance until the SUV was stopped was measured. This test was conducted repeatedly five times for each type of tires in each of a brand-new condition (called "early stage of wear" in Table 1), and a worn condition with wearing of 3 mm (called "middle stage of wear" in Table 1). Thereafter, the average value of three of the five braking distances excluding the greatest and smallest values was calculated, and the wet traction was evaluated based on the inverse of the calculated average value.
[Wear Resistance]

Subsequent to the aforementioned test, the SUV was driven to run on an asphalt road over a distance of 15,000 km at a speed of 40 km/h to 100 km/h. Then, each of the tires after the run was measured to determine step amounts around the lug grooves and around the sipes at 16 positions in the circumference surface of the tire. The average value of the step amounts thus measured was calculated, and the wear resistance was evaluated based on the inverse of the calculated average value.

TABLE 1

|  |  |  | EXAMPLES | | | COMPARATIVE EXAMPLES | | |
|---|---|---|---|---|---|---|---|---|
|  |  |  | 1 | 2 | 3 | 1 | 2 | 3 |
| WIDTH W1 OF MAIN PART OF LAND PORTION 12 (mm) | | | 25 | 10 | 50 | 25 | 25 | 25 |
| DEPTH h1 OF DENT PART 5 (mm) | | | 8 | 8 | 8 | 8 | 8 | 11 |
| DEPTH h2 OF SIPE 6 IN BOTH END REGIONS (mm) | | | 7 | 7 | 7 | 7 | 4 | 7 |
| DEPTH h3 OF SIPE 6 IN CENTER REGION (mm) | | | 4 | 4 | 4 | 7 | 7 | 7 |
| EVALUATION | WET TRACTION | EARLY STAGE OF WEAR | 115 | 105 | 100 | 100 | 105 | 95 |
|  |  | MIDDLE STAGE OF WEAR | 105 | 110 | 100 | 100 | 90 | 105 |
|  | WEAR RESISTANCE | AROUND LUG GROOVE | 120 | 105 | 110 | 100 | 120 | 90 |
|  |  | AROUND SIPE | 120 | 105 | 110 | 100 | 120 | 80 |

Table 1 clearly shows that the tires of the present invention achieve both wet traction and wear resistance improved in good balance, as compared with those of the tires of Comparative Examples.

What is claimed is:

1. A pneumatic tire in which a plurality of land portions defined by main grooves extending in a tire circumferential direction are formed in a tread surface, and in which both side walls of each of at least two land portions of the plurality of land portions are provided with a plurality of dent parts formed at certain intervals in the tire circumferential direction,
   each of the dent parts having a smaller depth than the main grooves defining the land portion where the dent part is formed,
   a plurality of sipes, each formed to traverse in a tire width direction between the dent parts formed in both the side walls of the land portion,
   each of the dent parts having an upper base which extends in the tire circumferential direction, a first one of the sipes extending from a first location at an upper base of a first one of the dent parts to a first location at an upper base of a second one of the dent parts, and a second one of the sipes extending from a second location at the upper base of the first one of the dent parts to a second location at the upper base of the second one of the dent parts without crossing the first one of the sipes, the first and second locations at the upper base of the first one of the dent parts being spaced from each other in the tire circumferential direction and the first and second locations at the upper base of the second one of the dent parts being spaced from each other in the tire circumferential direction,
   each of the sipes having a greater depth in both end regions opening to the dent parts than in a center region between both the end regions, and
   the land portion where the dent parts are formed in both of the side walls has a lug groove formed between each two of the dent parts adjacent in the tire circumferential direction and is formed as a block row, the lug groove being inclined with respect to the tire width direction and extending to an inside of an other one of the land portions next to the land portion, a portion of the lug groove inside the other one of the land portions having a tip bent end in a dogleg shape, and the other one of the land portions including at least one sipe formed to traverse an area between the dogleg shaped tip bent end of the lug groove and the main groove formed between the land portion and the other one of the land portions.

2. The pneumatic tire according to claim 1, wherein the dent parts formed in both the side walls of the land portion are arranged to be offset from each other in the tire circumferential direction.

3. The pneumatic tire according to claim 1, wherein a width W1 of a main part of the land portion in which the dent parts are formed in both the side walls is 10 mm to 50 mm.

4. The pneumatic tire according to claim 3, wherein a width W2 of each of the dent parts in the tire width direction is 5% to 20% of the width W1 of the main part of the land portion.

5. The pneumatic tire according to claim 1, wherein the sipes are each formed to have a plurality of bending parts, and to be inclined in the center region with respect to the tire width direction.

6. The pneumatic tire according to claim 5, wherein a degree of 70° to 150° is set for an intersecting angle between a center part of each of the sipes in the center region inclined with respect to the tire width direction, and a side part of the sipe extending from the bending part at either end of the center part of the sipe toward a corresponding one of the end regions.

7. The pneumatic tire according to claim 1, wherein each of the dent parts in a plan view is in a trapezoidal shape having, as a lower base, an edge line between two intersections of the dent part and the main groove that defines the land portion where the dent part is formed, and extending to an inner side of the land portion, the trapezoidal shape being set to have the lower base $L_1$ within a range of 10 mm $\leq L_1 \leq$ 20 mm in length, and the upper base $L_2$ within a range of 3 mm $\leq L_2 \leq$ 15 mm in length, where $L_2 < L_1$.

8. The pneumatic tire according to claim 7, wherein two or more land portions where the dent parts are formed are arranged side by side with a single main groove in between, the dent parts in side walls, facing each other across the main groove, of the adjacent land portions are arranged in a way that the upper bases of the dent parts overlap each other along the tire circumferential direction and that a length $L_3$ of the overlapping part of the upper bases is 3 mm to 30 mm.

9. The pneumatic tire according to claim 7, wherein
the first location of the upper base $L_2$ of the first one of the dent parts corresponds to one end of the upper base $L_2$ of the first one of the dent parts, the second location of the upper base $L_2$ of the first one of the dent parts corresponds to the other end of the upper base $L_2$ of the first one of the dent parts, the first location of the upper base $L_2$ of the second one of the dent parts corresponds to one end of the upper base $L_2$ of the second one of the dent parts, and the second location of the upper base $L_2$ of the second one of the dent parts corresponds to the other end of the upper base $L_2$ of the second one of the dent parts.

10. The pneumatic tire according to claim 1, wherein
one of the land portions, in which the dent parts are not formed, extends in the tire circumferential direction at the center region in the tire width direction of the tire tread surface.

11. The pneumatic tire according to claim 1, wherein
the other one of the land portions includes a plurality of sipes formed to traverse the area of the other one of the land portions between the dogleg shaped tip bent end of the lug groove and the main groove formed between the land portion and the other one of the land portions.

\* \* \* \* \*